(12) United States Patent
Kwon et al.

(10) Patent No.: US 9,215,348 B2
(45) Date of Patent: Dec. 15, 2015

(54) METHOD OF SELECTING A WORKFORM HAVING REDEFINED ATTRIBUTE INFORMATION IN AN IMAGE FORMING APPARATUS AND IMAGE FORMING APPARATUS FOR PERFORMING THE METHOD

(75) Inventors: So-yeong Kwon, Suwon-si (KR); Chang-min Han, Ansan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 118 days.

(21) Appl. No.: 13/137,473

(22) Filed: Aug. 18, 2011

(65) Prior Publication Data

US 2012/0081739 A1   Apr. 5, 2012

(30) Foreign Application Priority Data

Oct. 1, 2010   (KR) .......................... 10-2010-0095969

(51) Int. Cl.
  *H04N 1/44*   (2006.01)
  *H04N 1/00*   (2006.01)

(52) U.S. Cl.
  CPC ......... *H04N 1/4413* (2013.01); *H04N 1/00949* (2013.01); *H04N 1/00954* (2013.01); *H04N 1/00957* (2013.01); *H04N 1/4433* (2013.01); *H04N 2201/3205* (2013.01)

(58) Field of Classification Search
  CPC ... G06F 3/1205; G06F 3/1208; G06F 3/1238; G06F 3/1257; G06F 3/1258; G06F 3/1263; G06F 3/1275; H04N 2201/0096; H04N 2201/0094; H04N 1/00456; H04N 1/00482
  See application file for complete search history.

(56) References Cited

U.S. PATENT DOCUMENTS

| | | | |
|---|---|---|---|
| 7,408,658 B2 * | 8/2008 | Twede | 358/1.15 |
| 7,688,458 B2 * | 3/2010 | Goel et al. | 358/1.13 |
| 2003/0103232 A1 | 6/2003 | Twede | |
| 2005/0028073 A1 * | 2/2005 | Henry et al. | 715/500 |
| 2006/0221360 A1 * | 10/2006 | Yoshida | 358/1.1 |
| 2009/0009795 A1 * | 1/2009 | Kong | 358/1.15 |
| 2010/0110500 A1 * | 5/2010 | Inoue | 358/468 |
| 2010/0188700 A1 * | 7/2010 | Fujimori et al. | 358/1.15 |
| 2010/0277764 A1 * | 11/2010 | Yamazaki | 358/1.15 |

FOREIGN PATENT DOCUMENTS

| | | |
|---|---|---|
| GB | 2407900 | 5/2005 |
| JP | 2007-133727 | 5/2007 |
| JP | 2008-052445 | 3/2008 |

OTHER PUBLICATIONS

Extended European Search Report dated Apr. 20, 2012 issued in corresponding European Patent Application No. 11178625.7.
Chinese Office Action dated Feb. 2, 2015 in Chinese Patent Application No. 201110295917.5, 20 pages.

* cited by examiner

*Primary Examiner* — Benny Q Tieu
*Assistant Examiner* — Haris Sabah
(74) *Attorney, Agent, or Firm* — Staas & Halsey LLP

(57) ABSTRACT

A method of performing an operation in an image forming apparatus by using a workform which defines one or more workflows indicating one or more operations to be performed with respect to input data includes: receiving identification information of a user of the image forming apparatus; with respect to a workform selected by the user from among one or more workforms pre-existing in the image forming apparatus, determining whether there exists a workform which is redefined corresponding to the received identification information; and if it is determined that there exists the redefined workform, performing an operation according to the workform which is redefined corresponding to the identification information.

15 Claims, 5 Drawing Sheets

FIG. 4

| | TYPE | Input | Transmit 1 | Transmit 2 | Transmit 3 | Option |
|---|---|---|---|---|---|---|
| FIRST WORKFORM | COMMON | Box1 – DOC1 | Email:a@b.c b@c.d | Fax:02-123-4567 031-234-5678 | | |
| | FIRST USER | Box2 – DOC2 | Email:c@d.e d@e.f | Fax:061-345-6789 | | |
| | SECOND USER | Box1 – DOC3 | Email:e@f.g | Fax:051-456-7890 | | |
| SECOND WORKFORM | COMMON | Fax:02-345-6789 | Print : ONE COPY | Store : USB memory | Email:f@g.h | |
| | THIRD USER | Fax:051-356-7890 | Print : TWO COPIES [DUAL-SIDED PRINTING] | Store : Box1- | Email:g@h.i h@i.j | | ized, such that the description is not to be construed as limiting the general inventive concept.

METHOD OF SELECTING A WORKFORM HAVING REDEFINED ATTRIBUTE INFORMATION IN AN IMAGE FORMING APPARATUS AND IMAGE FORMING APPARATUS FOR PERFORMING THE METHOD

CROSS-REFERENCE TO RELATED APPLICATIONS

This application claims the benefit of Korean Patent Application No. 10-2010-0095969, filed on Oct. 1, 2010, in the Korean Intellectual Property Office, the disclosure of which is incorporated herein in its entirety by reference.

BACKGROUND

1. Field

The present general inventive concept relates to a method of performing an operation in an image forming apparatus and an image forming apparatus for performing the method.

2. Description of the Related Art

Image forming apparatuses such as a printer, a scanner, and a multi-function peripheral device perform at least one function from among printing, scanning, copying, transmitting/receiving facsimile data, sending an email message, and transmitting data to a server. In order to perform a plurality of operations by using such functions of an image forming apparatus, a user respectively inputs commands commanding that those operations be performed. However, if a workform function of defining workflows indicating the plurality of operations to be performed is executable in the image forming apparatus, the user may execute the workform function with a simple manipulation to conveniently perform the plurality of operations, without respectively inputting the commands for performing the operations. In this case, since operations indicated by pre-defined workflows are fixed, in order to perform operations slightly different from the fixed operations indicated by the workflows, a new workform needs to be created and stored.

SUMMARY

The present general inventive concept provides a method of performing an operation in an image forming apparatus for efficiently using resources by preventing workforms from being repeatedly created and stored, and an image forming apparatus for performing the method. Also, the present general inventive concept also provides a non-transitory computer-readable recording medium having embodied thereon a program for executing the method. The present general inventive concept is not limited to the above, and other technical solutions may be present.

According to an aspect of the present general inventive concept, there is provided a method of performing an operation in an image forming apparatus by using a workform which defines one or more workflows indicating one or more operations to be performed with respect to input data, the method including: receiving identification information of a user of the image forming apparatus; with respect to a workform selected by the user from among one or more workforms pre-existing in the image forming apparatus, determining whether there exists a workform which is redefined corresponding to the received identification information; and if it is determined that there exists the redefined workform, performing an operation according to the workform which is redefined corresponding to the identification information.

According to another aspect of the present general inventive concept, there is provided a method of creating a workform which defines one or more workflows indicating one or more operations to be performed in an image forming apparatus with respect to input data, the method including: with respect to a workform selected by a user from among one or more workforms pre-existing in the image forming apparatus, creating a workform corresponding to identification information of the user in which at least one of an attribute of input data and attributes of operations to be performed is redefined; and storing information about the created redefined workform.

According to another aspect of the present general inventive concept, there is provided a non-transitory computer-readable recording medium having embodied thereon a program for executing the method.

According to another aspect of the present general inventive concept, there is provided an image forming apparatus for performing an operation by using a workform which defines one or more workflows indicating one or more operations to be performed with respect to input data, the image forming apparatus including: an interface unit for receiving identification information of a user of the image forming apparatus; a storage unit for storing information about one or more workforms and identification information of users of the image forming apparatus; a selection unit for selecting any one workform from among the stored workforms according to selection information input by the user; a determination unit for determining whether there exists a workform which is redefined corresponding to the received identification information with respect to the selected workform; and an operation performing unit for performing an operation according to the workform which is redefined corresponding to the identification information, if it is determined that there exists the redefined workform.

BRIEF DESCRIPTION OF THE DRAWINGS

The above and other features and advantages of the present general inventive concept will become more apparent by describing in detail exemplary embodiments thereof with reference to the attached drawings in which:

FIG. 4 is a table showing an example where workform information is stored in a workform information database;

DETAILED DESCRIPTION

The present general inventive concept will now be described more fully with reference to the accompanying drawings, in which exemplary embodiments of the general inventive concept are shown.

Figure 1:
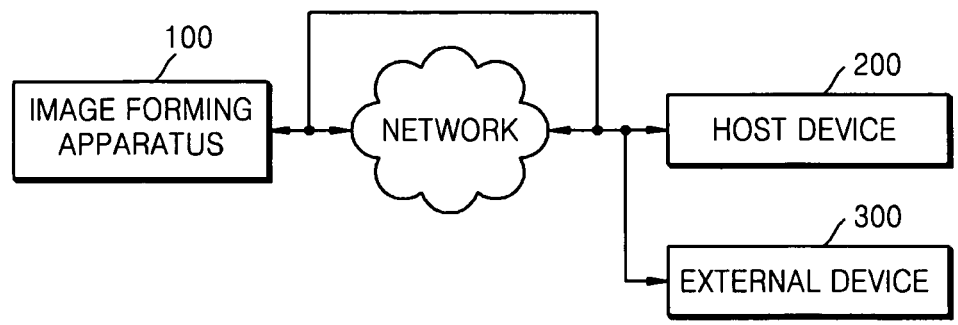
FIG. 1 is a block diagram illustrating an environment where an image forming apparatus according to an embodiment of the present general inventive concept is used.

FIG. 1 is a block diagram illustrating an environment where an image forming apparatus 100 according to an embodiment of the present general inventive concept is used. Referring to FIG. 1, the image forming apparatus 100 may be connected to a host device 200 and an external device 300.

Although one image forming apparatus 100, one host device 200, and one external device 300 are illustrated in FIG. 1, the present embodiment is not limited thereto, and one or more image forming apparatuses 100 may be connected to one or more host devices 200 and one or more external devices 300.

In FIG. 1, the image forming apparatus 100, the host device 200, and the external device 300 may transmit and receive data via a wired or wireless network, a wired serial communication, or the like by using a communication module disposed in each of the image forming apparatus 100, the host device 200, and the external device 300. Examples of the network may be the Internet, a local area network (LAN), a wireless LAN, a wide area network (WAN), and a personal area network (PAN), but the present embodiment is not limited thereto, and any other network for transmitting and receiving information may be used.

In FIG. 1, examples of the image forming apparatus 100, which is an apparatus for forming an image, may be a printer, a scanner, and a multi-function peripheral (MFP). Accordingly, the image forming apparatus 100 may perform a printing operation, a scanning operation, a copying operation, an operation of transmitting/receiving facsimile data, an operation of sending an email message, and an operation of transmitting a file to a server, etc., but the present embodiment is not limited thereto, and various other operations according to environments may be performed.

The host device 200, which is a device for controlling the image forming apparatus 100, may be any device connected to the image forming apparatus 100 and adapted to control the image forming apparatus 100. Examples of the host device 200 may be a general-purpose computer system and a personal digital assistant.

The external device 300 may be any device connected to the image forming apparatus 100 via a wired or wireless network, a wired serial communication, or the like. Examples of the external device 300 may be a general-purpose computer system, a server device, and a universal serial bus (USB) memory.

In FIG. 1, examples of the server device may be a file transfer protocol (FTP) server and a server message block (SMB) server, and it would be understood by one or ordinary skill in the art that the examples of the server device may also be an email server for sending an email message.

As described above, the image forming apparatus 100 may perform various operations using input data. For example, the input data may be acquired by performing a scanning operation in the image forming apparatus 100, or may be received from the host device 200 or the external device 300. Also, the image forming apparatus 100 may perform a printing operation and a storage operation using the input data, or may transmit the input data to the external device 300.

Figure 2:
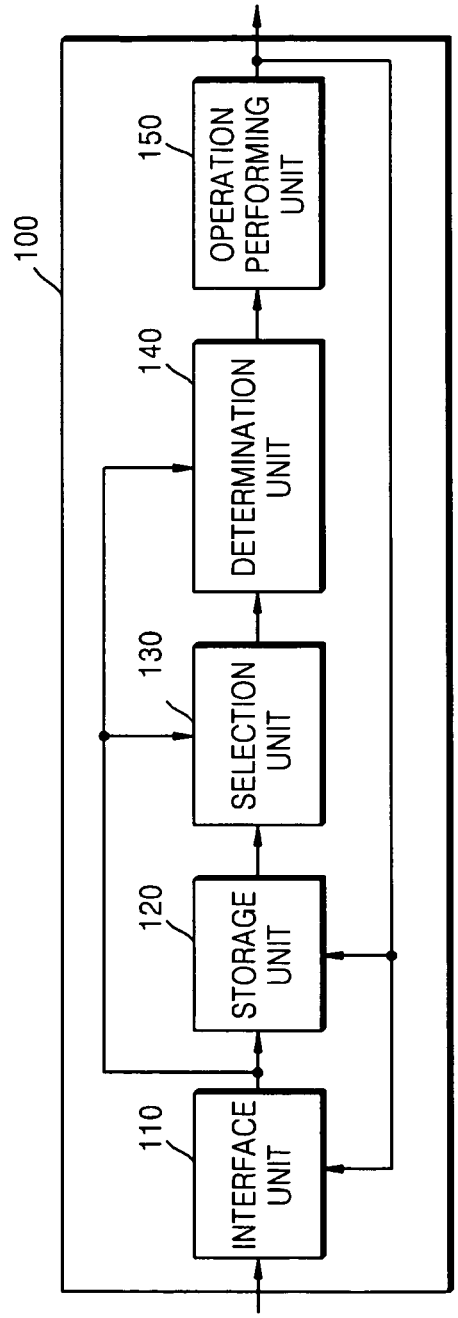
FIG. 2 is a block diagram of the image forming apparatus of FIG. 1.

FIG. 2 is a block diagram of the image forming apparatus 100 of FIG. 1. Referring to FIG. 2, the image forming apparatus 100 includes an interface unit 110, a storage unit 120, a selection unit 130, a determination unit 140, and an operation performing unit 150.

Elements of the image forming apparatus 100 related to the present embodiment are illustrated in FIG. 2. Accordingly, it would be understood by one of ordinary skill in the art that general-purpose elements other than those illustrated in FIG. 2 may be further included in the image forming apparatus 100.

Also, each of the selection unit 130 and the determination unit 140 of the image forming apparatus 100 of FIG. 2 may correspond to one or more processors. The processors may each be realized as an array of logic gates, or as a combination of a general-purpose microprocessor and a memory in which a program executable in the microprocessor is stored. Also, it would be understood by one of ordinary skill in the art that the processors may be realized as another type of hardware.

In FIG. 2, the image forming apparatus 100 performs various operations by using a workform that defines one or more workflows indicating one or more operations to be performed with respect to input data. Accordingly, a user of the image forming apparatus 100 may conveniently perform various repeatedly performed operations by using the workform existing in the image forming apparatus 100.

The interface unit 110 receives identification information of a user of the image forming apparatus 100. Here, the term 'identification information' refers to information used in the image forming apparatus 100 in order to identify a plurality of users of the image forming apparatus 100. For example, the identification information may include an identifier (ID) and password of each user.

Also, it would be understood by one of ordinary skill in the art that the interface unit 110 may acquire identification information directly input to the image forming apparatus 100 by a user or receive identification information through the host device 200 connected to the image forming apparatus 100.

The storage unit 120 stores information about one or more workforms, and identification information of users of the image forming apparatus 100. The information about the workforms may include information about input data and operations to be performed constituting workflows.

Also, the information about the workforms may further include information about a workform which is redefined corresponding to each of a plurality of users with respect to each of a plurality of workforms. For example, the information about the redefined workform corresponding to each of the plurality of users may include information about an attribute of input data and an attribute of each of operations to be performed constituting workflows according to each of the users.

The attribute of the input data includes at least one of an attribute of data stored in the image forming apparatus 100, an attribute of a host device from which print data is transmitted to the image forming apparatus 100, and a sender number from which facsimile data is transmitted to the image forming apparatus 100.

For example, the attribute of the data stored in the image forming apparatus 100 represents a name of a document indicating the data stored in the image forming apparatus 100, a creator of the document, a storage location of the document, and so on.

For example, the attribute of the host device from which the print data is transmitted to the image forming apparatus 100 represents a name of the host device, a user of the host device, and so on.

For example, the sender number from which the facsimile data is transmitted to the image forming apparatus 100 represents a sender number from which the facsimile data is transmitted to the image forming apparatus 100.

Also, the attribute of each of the operations to be performed includes at least one of a storage location corresponding to a storage operation performed in the image forming apparatus 100, a sender number corresponding to an operation of transmitting facsimile data performed in the image forming apparatus 100, a sender address corresponding to an operation of sending an email message performed in the image forming apparatus 100, an attribute of an external device corresponding to an operation of transmitting data to an external device performed in the image forming apparatus 100, and a print attribute corresponding to a printing operation performed in the image forming apparatus 100.

For example, the storage location corresponding to the storage operation performed in the image forming apparatus 100 may represent the storage unit 120 in the image forming apparatus 100, a USB memory or a server device, which is an example of the external device 300. Also, if the image forming apparatus 100 has a document box function, the storage location may be any document box from among a plurality of document boxes included in the storage unit 120.

For example, the sender number corresponding to the operation of transmitting the facsimile data performed in the image forming apparatus 100 may represent a sender's facsimile number, and the sender address corresponding to the operation of sending the email message performed in the image forming apparatus 100 may represent a sender's email address.

For example, the attribute of the external device corresponding to the operation of transmitting the data to the external device performed in the image forming apparatus 100 may represent a type of the external device, a method of transmitting the data to the external device, and so on. The type of the external device may represent, for example, a USB memory or a server device connected to the image forming apparatus 100, and the method of transmitting the data to the external device may be any one of various data transmission methods.

For example, the print attribute corresponding to the printing operation performed in the image forming apparatus 100 may represent a number of copy of printing (for example, one copy, two copies, etc.), dual-sided printing, color printing, and so on.

As described above, the storage unit 120 stores a plurality of workforms and a workform which is redefined corresponding to each of a plurality of users with respect to each of the workforms. Accordingly, a user may conveniently perform a desired operation by using a workform which is redefined corresponding to identification information of the user from among the workforms stored in the storage unit 120.

Also, since the storage unit 120 stores a redefined workform in which only an attribute of input data and attributes of operations to be performed with respect to a pre-existing workform are redefined, an extravagant use of resources resulting from creation and storage of a new workform may be prevented.

That is, since the storage unit 120 may individually store and manage redefined data corresponding to each of identification information of a plurality of users with respect to a pre-existing template, relatively lots of data existing in the image forming apparatus 100 may be efficiently managed.

Accordingly, since a workform of the image forming apparatus 100 may be dynamically used, user convenience may be improved.

It would be understood by one of ordinary skill in the art that examples of the storage unit 120 may be a hard disk drive (HDD), a high capacity read only memory (ROM), a random access memory (RAM), a flash memory, and a memory card.

The selection unit 130 selects any one of workforms stored in the storage unit 120 according to selection information input by a user. For example, the user selects one workform including a workflow indicating a desired operation to be performed by referring to information about a plurality of workforms pre-created and stored in the image forming apparatus 100.

A case where a user desires to perform a storage operation and an operation of sending an email message with respect to scan data by using the image forming apparatus 100 will be explained in detail.

As the user executes a workform function of the image forming apparatus 100, the image forming apparatus 100 provides information about a plurality of workforms pre-created and then stored in the image forming apparatus 100 to the user. The information about the plurality of workforms may be directly displayed on the image forming apparatus 100 via the interface unit 110 of the image forming apparatus 100, or may be displayed on the host device 200 connected to the image forming apparatus 100.

Accordingly, the user selects a workform including workflows corresponding to the storage operation and the operation of sending the email message from among the plurality of workforms. As described above, the user may directly select any workform in the image forming apparatus 100 via the interface unit 110, or may select any workform by using the host device 200 connected to the image forming apparatus 100. The selection unit 130 selects any one of the workforms stored in the storage unit 120 by referring to the selection information of the user.

The determination unit 140 determines whether there exists a workform which is redefined corresponding to identification information received via the interface unit 110 with respect to the workform selected by the selection unit 130. In a redefined workform, at least one of an attribute of input data and an attribute of one or more operations to be performed constituting workflows are redefined for each of a plurality of users.

For example, the determination unit 140 determines whether there exists a workform which is redefined corresponding to identification information of the user with respect to the workform selected by the user by referring to the information about the workforms stored in the storage unit 120.

As described above, the storage unit 120 includes information about a workform which is redefined corresponding to each of a plurality of users with respect to each of a plurality of workforms. Accordingly, the determination unit 140 may determine whether there exists a workform which is redefined corresponding to the identification information with respect to the workform selected by the user by referring to the storage unit 120.

The case where a user desires to perform a storage operation and an operation of sending an email message with respect to scan data by using the image forming apparatus 100 will be explained in detail.

As described above, the selection unit 130 may select a workform including workflows corresponding to the storage operation and the operation of sending the email message, and the determination unit 140 may determine whether there exists a workform which is redefined corresponding to identification information with respect to a workform selected by the user.

The workform selected by the user may correspond to a common workform used by a plurality of users of the image forming apparatus 100, and the determination unit 140 may determine whether there exists a workform which is redefined corresponding to identification information of a user with respect to the common workform.

In detail, the common workform may include workflows corresponding to a storage operation of storing data in a server device connected to the image forming apparatus 100 with respect to scan data, and an operation of sending an email message to a first email address with respect to the scan data.

In the workform which is redefined corresponding to the identification information of the user, a storage location, as an attribute of the storage operation, and a sender address, as an attribute of the operation of sending the email message, may be redefined. That is, the workform which is redefined corresponding to the identification information of the user may include workflows corresponding to a storage operation for storing data in a USB memory connected to the image forming apparauts 100 with respect to scan data, and an operation of sending an email message to a second email address with respect to the scan data.

As such, the image forming apparatus 100 stores a common workform redefined according to characteristics of an operation repeatedly used by a user. Accordingly, if the user performs an operation corresponding to standard workflows (for example, a storage operation and an operation of sending an email message) defined in the common workform and only attributes of operations to be performed (for example, a storage location and a sender address) are changed, the user may redefine the attributes of the operations to be performed of the workflows included in the common workform and store the same in the image forming apparatus 100. Accordingly, workforms may be prevented from being repeatedly created in the image forming apparatus 100.

As described above, if there exists in the storage unit 120 the workform which is redefined corresponding to the identification information of the user, the determination unit 140 determines that there exists the workform which is redefined corresponding to the identification information of the user, and the operation performing unit 150 performs a corresponding operation.

If it is determined by the determination unit 140 that there exists the redefined workform, the operation performing unit 150 performs an operation according to the workform which is redefined corresponding to the identification information received via the interface unit 110.

For example, if it is determined by the determination unit 140 that there exists the redefined workform, the operation performing unit 150 extracts information about the workform which is redefined corresponding to the identification information from the storage unit 120, and performs at least one of a storage operation, an operation of transmitting facsimile data, an operation of sending an email message, an operation of transmitting data to an external device, and a printing operation according to the extracted workform.

A case where a user desires to perform a storage operation of storing data in a USB memory and an operation of sending an email message to a second email address with respect to scan data by using the image forming apparatus 100 will be explained in detail. The operation performing unit 150 extracts a workform which is redefined corresponding to the user from the storage unit 120. The operation performing unit 150 performs a storage operation of storing scan data in a USB memory and an operation of sending the scan data to a second email address via email by referring to the extracted workform.

Accordingly, the user may conveniently perform a repeatedly performed operation. Also, since the image forming apparatus 100 may store a common workform used by a plurality of users, and also a workform which is redefined corresponding to each of the plurality of users with respect to the common workform, an extravagant use of resources resulting from repeated creation and storage of workforms that include the same workflows but different attributes of input data or operations to be performed may be prevented.

Figure 3:
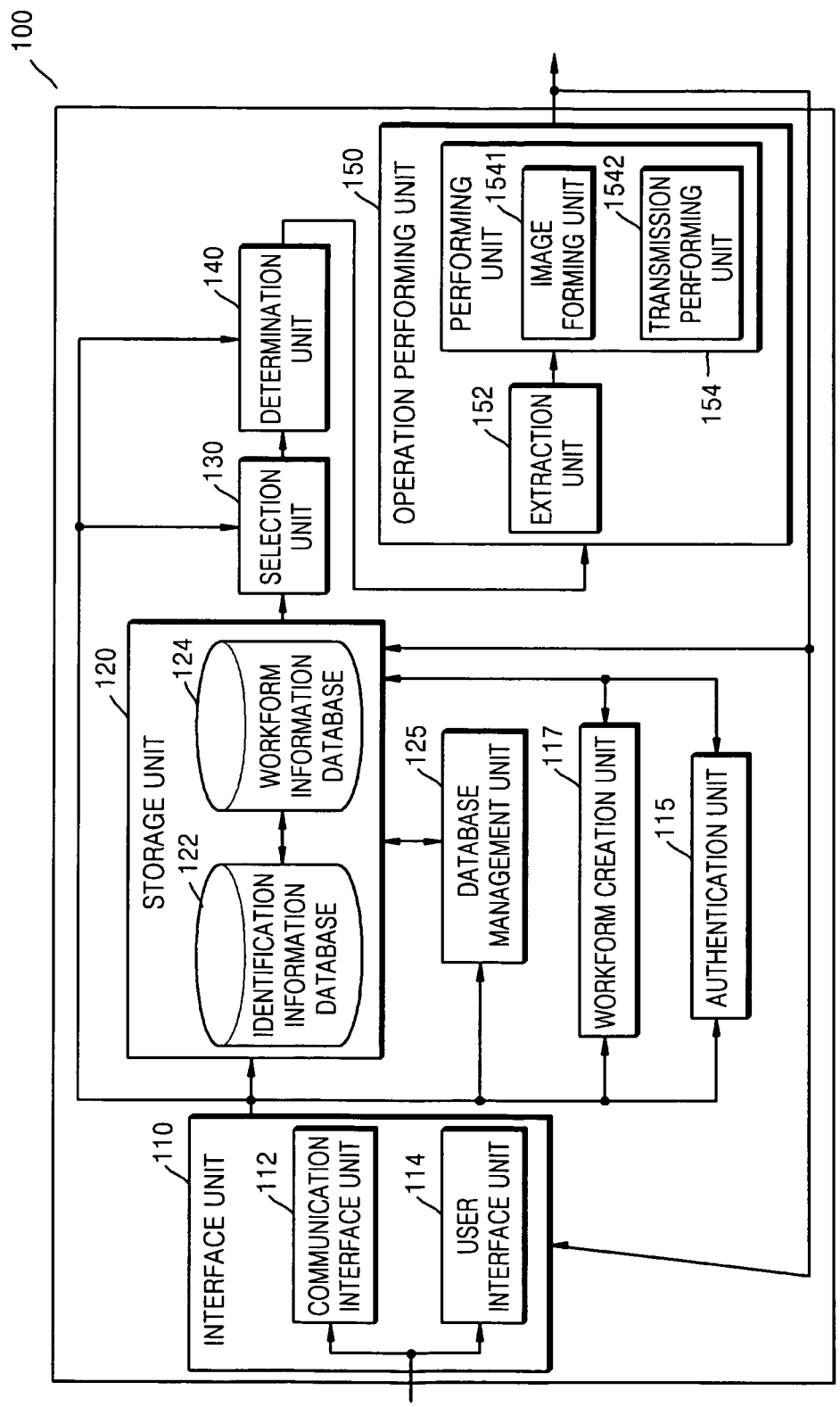
FIG. 3 is a detailed block diagram of the image forming apparatus of FIG. 1.

FIG. 3 is a detailed block diagram of the image forming apparatus 100 of FIG. 1. Referring to FIG. 3, the image forming apparatus 100 includes the interface unit 110, an authentication unit 115, a workform creation unit 117, the storage unit 120, a database management unit 125, the selection unit 130, the determination unit 140, and the operation performing unit 150. Also, the interface unit 110 includes a communication interface unit 112 and a user interface unit 114, the storage unit 120 includes an identification information database 122 and a workform information database 124, and the operation performing unit 150 includes an extraction unit 152 and a performing unit 154. In addition, the performing unit 154 includes an image forming unit 1541 and a transmission performing unit 1542.

Elements of the image forming apparatus 100 related to the present embodiment are illustrated in FIG. 3. Accordingly, it would be understood by one of ordinary skill in the art that general-purpose elements other than those illustrated in FIG. 3 may be further included in the image forming apparatus 100.

Also, the image forming apparatus 100 illustrated in FIG. 3 is an example of the image forming apparatus 100 illustrated in FIGS. 1 and 2. Accordingly, the image forming apparatus 100 is not limited to the units illustrated in FIG. 3. Also, the descriptions provided with respect to FIGS. 1 and 2 apply to the image forming apparatus 100 illustrated in FIG. 3, and thus will not be repeated.

Referring to FIG. 3, each of the authentication unit 115, the workform creation unit 117, the database management unit 125, the selection unit 130, the determination unit 140, and the extraction unit 152 of the image forming apparatus 100 of FIG. 3 may correspond to one or more processors. The processors may each be realized as an array of logic gates, or as a combination of a general-purpose microprocessor and a memory in which a program executable in the microprocessor is stored. Also, it would have been understood by one of ordinary skill in the art that the processors may be realized as another type of hardware.

The image forming apparatus 100 in FIG. 3 may perform various operations by using a workform that defines one or more workflows indicating one or more operations to be performed with respect to input data. A common workform used by a plurality of users and a workform which is redefined corresponding to each of the plurality of users with respect to the common workform may exist.

Accordingly, the image forming apparatus 100 may conveniently perform repeated operations by a user, by using a workform which is redefined corresponding to identification information of the user.

The interface unit 110 receives identification information of a user of the image forming apparatus 100. Referring to FIG. 3, the interface unit 110 includes the communication interface unit 112 and the user interface unit 114.

The communication interface unit 112 receives the identification information of the user through the host device 200 connected to the image forming apparatus 100. Also, the communication interface unit 112 may receive print data from the host device 200, transmit and receive an email message to and from an email server, transmit and receive facsimile data to and from a facsimile, and transmit and receive data to and from an external device.

The communication interface unit 112 in FIG. 3 may transmit and receive data to and from an external device by using a file sharing protocol (for example, a network file system (NFS) or a common internet file system (CIFS)). Since the file sharing protocol would be well known to one of ordinary skill in the art, a detailed explanation thereof will not be given.

Also, examples of the communication interface unit 112 may be a modem used to send and receive facsimile data, a network module for accessing a network, and a USB host module for establishing a data movement channel with a movable storage medium, corresponding to functions of the image forming apparatus 100.

The user interface unit 114 receives identification information directly input to the image forming apparatus 100 by a user. Also, the user interface unit 114 may display a plurality of workforms stored in the image forming apparatus 100, receive selection information indicating any one of the plurality of workforms selected by the user, receive and display input information for creating a common workform from the user, or receive and display input information for creating a workform which is redefined corresponding to the user.

The user interface unit 114 in FIG. 3 acquires input information from a user and displays output information to the user. Examples of the user interface unit 114 may be an input/output device such as a display panel, a mouse, a keyboard, a touch screen, or a monitor, and a software module for driving the input/output device.

Accordingly, the interface unit 110 may receive identification information of a user by using the communication interface unit 112 and the user interface unit 114.

The authentication unit 115 authenticates the identification information received via the interface unit 110 by referring to identification information stored in the storage unit 120. In detail, the authentication unit 115 authenticates the identification information received via the interface unit 110 by using the identification information stored in the identification information database 122 of the storage unit 120.

For example, if identification information of a user registered in the image forming apparatus 100 is added to the identification information database 122, the authentication unit 115 may authenticate the identification information of the user by referring to the identification information database 122. That is, if identification information matching identification information of a user received via the interface unit 110 exists in the identification information database 122, the authentication unit 115 confirms the user corresponding to the received identification information as an authenticated user.

As such, a process of authenticating a user by using the authentication unit 115 may be a login operation using identification information of a user. That is, the user may be allowed to perform a predetermined operation in the image forming apparatus 100 after logging in the image forming apparatus 100.

The workform creation unit 117 creates a common workform for users of the image forming apparatus 100. Also, the workform creation unit 117 creates a workform which is redefined corresponding to identification information of each user with respect to the common workform.

For example, a user creates a common workform for a plurality of users of the image forming apparatus 100 by using a host device connected to the image forming apparatus 100 via the communication interface unit 112 or the user interface unit 114.

Here, the expression "creates a common workform" refers to a process of defining workflows included in a workform and determining an attribute of input data and attributes of operations to be performed with respect to the defined workflows.

For example, a user may create a common workform including a workflow corresponding to a printing operation for printing one copy of facsimile data received from a first sender number and a workflow corresponding to an operation of sending an email message for transmitting the facsimile data received from the first sender number to a third email address via email.

In this case, input data may be the facsimile data, and an attribute of the input data may be the first sender number. Also, operations to be performed may be the printing operation and the operation of sending the email message, and attributes of the operations to be performed may be the printing of the one copy and the third email address.

Accordingly, the workform creation unit 117 may create a workform according to input data and operations to be performed as described above, and information about the created workform may be stored in the workform information database 124 of the storage unit 120.

Also, the workform creation unit 117 creates a workform which is redefined corresponding to identification information of a user with respect to the common workform.

For example, the workform creation unit 117 may create a redefined workform in which an attribute of input data and attributes of operations to be performed included in the common workform are redefined.

For example, a user may redefine an attribute of the input data as a second sender number, and attributes of the operations to be performed as printing of two copies and a fourth email address. In this case, the workform creation unit 117 may create a redefined workform including a workflow corresponding to a printing operation for printing two copies of facsimile data received from the second sender number and a workflow corresponding to an operation of sending an email message for transmitting the facsimile data received from the second sender number to the fourth email address via email.

Accordingly, the workform creation unit 117 may create a workform which is redefined corresponding to identification information of a user with respect to the common workform, and information about the workform which is redefined corresponding to the identification information of the user may be stored in the workform information database 124 of the storage unit 120.

Accordingly, the workform creation unit 117 creates a common workform and a redefined workform corresponding to the common workform, and information about the created workforms is stored in the storage unit 120.

The storage unit 120 stores information about one or more workforms, and identification information of users of the image forming apparatus 100. Referring to FIG. 3, the storage unit 120 includes the identification information database 122 and the workform information database 124.

The identification information database 122 stores identification information of users of the image forming apparatus 100. Once the information about the users of the image forming apparatus 100 is stored in the identification information database 122, the authentication unit 115 may perform authentication by referring to the identification information of the users stored in the identification information database 122.

The workform information database 124 stores information about one or more workforms. The information about the workforms may include input data and operations to be performed constituting workflows included in the workforms.

In detail, the workform information database 124 stores a common workform usable by a plurality of users, and a workform which is redefined corresponding to identification information of each user with respect to the common workform. Since the workform which is redefined corresponding to the identification information of each user is used by only a user corresponding to the identification information, the workform information database 124 may store user identification information by matching to a workform which is redefined corresponding to the identification information An example in which a common workform and a workform which is redefined corresponding to identification information of a user with respect to the common workform are stored in the workform information database 124 will be explained in detail with reference to FIG. 4.

The database management unit 125 manages the identification information database 122 and the workform information database 124. For example, the database management unit 125 manages the storage unit 120 to store a workform which is redefined corresponding to identification information after matching to the identification information.

For example, if there exists a workform which is redefined corresponding to identification information with respect to a common workform, the database management unit 125 manages the storage unit 120 to match the redefined workform to identification information stored in the identification information database 122 and to store the redefined workform in the workform information database 124.

Accordingly, the database management unit 125 may enable a common workform usable by a plurality of users and a workform which is redefined corresponding to identification information and usable by only an authenticated user to be systematically stored.

For example, the database management unit 125 may add identification information about a new user to the identification information database 122, or modify or delete identification information stored in the identification information database 122.

For example, the database management unit 125 may add information about a newly created common workform to the workform information database 124, or may add a workform which is redefined corresponding to identification information with respect to the common workform to the workform information database 124.

Also, when workforms to be modified or deleted, the database management unit 125 enables information about the workforms stored in the workform information database 124 to be modified or deleted.

Accordingly, the database management unit 125 may enable relatively lots of data existing in the image forming apparatus 100 to be efficiently stored, modified, or deleted.

The selection unit 130 selects any one of workforms stored in the workform information database 124 of the storage unit 120 according to selection information input by a user, and the determination unit 140 determines whether there exists a workform which is redefined corresponding to identification information received via the interface unit 110 with respect to the workform selected by the selection unit 130.

Accordingly, if it is determined by the determination unit 140 that there does not exist a redefined workform, the operation performing unit 150 performs an operation according to the workform selected by the selection unit 130.

Also, if it is determined by the determination unit 140 that there exists a redefined workform, the operation performing unit 150 performs an operation according to the workform which is redefined corresponding to the identification information.

Referring to FIG. 3, the operation performing unit 150 includes the extraction unit 152 and the performing unit 154.

If it is determined by the determination unit 140 that there exists a redefined workform, the extraction unit 152 extracts from the storage unit 120 information about the workform which is redefined corresponding to the identification information received via the interface unit 110. That is, the extraction unit 152 extracts from the workform information database 124 information about the workform which is redefined corresponding to the identification information.

The performing unit 154 performs any one of a storage operation, an operation of transmitting facsimile data, an operation of sending an email message, an operation of transmitting data to an external device, and a printing operation according to the workform extracted by the extraction unit 152. Referring to FIG. 3, the performing unit 154 includes the image forming unit 1541 and the transmission performing unit 1542.

The image forming unit 1541 performs a printing operation for printing print data on print paper. The image forming unit 1541 includes hardware units for performing charging, exposure, development, transfer, and fusing to perform a printing operation and a software module for driving the hardware units.

For example, if a workflow corresponding to a printing operation is included in the workform extracted by the extraction unit 152, the image forming unit 1541 performs a printing operation by referring to a print attribute corresponding to the workflow defined in the workform.

The transmission performing unit 1542 in FIG. 3 performs an operation of transmitting data to an external device. For example, if a workflow corresponding to a storage operation, an operation of transmitting facsimile data, an operation of sending an email message, and an operation of transmitting data to an external device is included in the workform extracted by the extraction unit 152, the transmission performing unit 1542 performs a transmission operation by referring to various attributes of the workflow defined in the workform. It would be understood by one of ordinary skill in the art that the transmission performing unit 1542 transmits input data to the communication interface unit 112 to perform a transmission operation, and the communication interface unit 112 transmits the input data.

In the case of a storage operation, if a storage operation for storing input data in an external device (for example, a USB memory) connected to the image forming apparatus 100 is indicated in a workflow defined in a workform, the transmission performing unit 1542 performs a transmission operation for transmitting the input data to the external device via the communication interface unit 112.

However, it would be understood by one of ordinary skill in the art that if a storage operation for storing input data in the image forming apparatus 100 is indicated in a workflow defined in a workform, the transmission performing unit 1542 stores the input data in the image forming apparatus 100 according to an attribute of the storage operation.

Also, the storage unit 120 may perform a document box function. That is, the storage unit 120 may include one or more document boxes that are classified according to attributes in order to separately store data according to the attributes. Examples of the attributes may be a creator of data, a time when the data is created, a location where the data is created, a type of the data, and whether data security information is set in the data.

For example, the storage unit 120 may include a common box, a public box, a secure box, and a user box, as examples of document boxes.

Accordingly, the transmission performing unit 1542 may store the input data in any one of a plurality of document boxes according to an attribute of the storage operation.

In the case of an operation of transmitting facsimile data, an operation of sending an email message, and an operation of transmitting data to an external device, if an operation for transmitting input data via facsimile, an operation of transmitting the input data via email, and an operation of transmitting the input data to an external device are indicated in a workflow defined in a workform, the transmission performing unit 1542 performs a transmission operation for transmitting the input data to a facsimile, an email server, and an external device via the communication interface unit 112.

Accordingly, since the image forming apparatus 100 may create and store a workform in which an attribute of input data and attributes of operations to be performed are redefined with respect to a pre-existing workform, unnecessary workforms are prevented from being repeatedly created, thereby preventing an extravagant use of resources.

Also, since a workform is redefined corresponding to identification information of a user of the image forming apparatus 100, the user of the image forming apparatus 100 may conveniently perform repeatedly performed complex operations with a simple operation of inputting the identification information.

FIG. 4 is a table showing an example where workform information is stored in the workform information database 124. Referring to FIG. 4, Table 41 shows an example where workform information is stored in the workform information database 124.

For example, it is assumed that a first workform 42 and a second workform 43 are stored in the workform information database 124. Also, each of the first workform 42 and the second workform 43 stores data according to a type 44, input data 45, a first operation to be performed (transmit 1) 46, a second operation to be performed (transmit 2) 47, a third operation to be performed (transmit 3) 48, and an option 49.

In detail, the first workform 42 may include a common first workform 421, a first workform 422 which is redefined corresponding to a first user, and a second workform 423 which is redefined corresponding to a second user.

The first workform 42 defines two workflows, and the two workflows may be a workflow indicating an operation of transmitting data stored in a document box by email, and a workflow indicating an operation of transmitting the data stored in the document box by facsimile.

Accordingly, the common first workform 421 performs an operation of transmitting input data doc 1 stored in a document box Box 1 to sender addresses a@b.c and b@c.d by email, and performs an operation of transmitting the input data doc 1 stored in the document box Box 1 to sender numbers 02-123-4567 and 031-234-5678 by facsimile.

The first user and the second user may respectively create the first workform 422 which is redefined corresponding to the first user and the second workform 423 which is redefined corresponding to the second user, in which an attribute of the input data and attributes of operations to be performed are redefined with respect to the common first workform 421.

That is, with respect to a template representing input data and operations to be performed of workflows defined in the common first workform 421, the workform information database 124 redefines and stores an attribute of input data and attributes of operations to be performed according to users in a state where the template is fixed. Accordingly, the workform information database 124 may systematically store and manage relatively lots of data efficiently.

Referring to Table 41, the first workform 422 which is redefined corresponding to the first user performs an operation of transmitting input data Doc 2 stored in a document box Box 2 to sender addresses c@d.e and d@e.f by email, and performs an operation of transmitting the input data Doc 2 stored in the document box Box 2 to a sender number 061-345-6789 by facsimile.

Also, the first workform 423 which is redefined corresponding to the second user performs an operation of transmitting input data Doc 3 stored in the document box Box 1 to a sender address e@f.g by email and performs an operation of transmitting the input data Doc 3 stored in the document box Box 1 to a sender number 051-456-7890 by facsimile.

In detail with reference to the image forming apparatus 100 illustrated in FIG. 3, the interface unit 110 receives identification information from the first user, and the selection unit 130 selects the common first workform 421 by referring to selection information input from the first user. The determination unit 140 determines whether there exists the first workform 422 which is redefined corresponding to the identification information of the first user with respect to the common first workform 421. Accordingly, the extraction unit 152 extracts information about the first workform 422 which is redefined corresponding to the identification information of the first user stored in the workform information database 124, and the performing unit 152 performs operations according to the first workform 422 which is redefined corresponding to the identification information of the user.

Also, descriptions with respect to the second user are the same as the descriptions with respect to the first user except that operations according to the first workform 423 which is redefined corresponding to identification information of the second user are performed, and thus will not be repeated.

Also, in the case of a third user, the interface unit 110 receives identification information from the third user. The selection unit 130 selects the common first workform 421 by referring to selection information input from the third user. The determination unit 140 determines that there does not exist a workform 422 which is redefined corresponding to the identification information of the third user with respect to the common first workform 421. Accordingly, the extraction unit 152 extracts information about the common first workform 421 stored in the workform information database 124, and the performing unit 154 performs operations according to the common first workform 421.

Accordingly, the first user and the second user may conveniently perform a plurality of operations by using the first workform 422 which is redefined corresponding to the first user and the first workform 423 which is redefined corresponding to the second user in which an attribute of input data and attributes of operations to be performed are redefined with respect to a workflow defined in the common first workform 421.

Also, if a workform which is redefined corresponding to identification information of a user does not exist in the image forming apparatus 100, operations corresponding to a common workform usable by a plurality of users may be performed.

For example, the second workform 43 defines three workflows, and the three workflows may be a workflow indicating a printing operation of printing facsimile data received by the image forming apparatus 100, a workflow indicating a storage operation of storing the facsimile data received by the image forming apparatus 100, and a workflow indicating an operation of transmitting the facsimile data received by the image forming apparatus 100 by email.

Accordingly, a common second workform 431 performs a printing operation of printing one copy of facsimile data received from a facsimile having a sender number 02-345-6789, performs a storage operation of storing the facsimile data received from the facsimile having the sender number 02-345-6789 in a USB memory, and an operation of transmitting the facsimile data received from the facsimile having the sender number 02-345-6789 to a sender address f@g.h by email.

The third user may create a second workform 432 which is redefined corresponding to the third user in which an attribute of input data and attributes of operations to be performed are redefined with respect to the common second workform 431.

Accordingly, the second workform 432 which is redefined corresponding to the third user performs a printing operation of dual-sided printing two copies of facsimile data received from a facsimile having a sender number 051-356-7890, performs a storage operation of storing the facsimile data received from the facsimile having the sender number 051-356-7890 in a document box Box 1 in the storage unit 120, and performs an operation of transmitting the facsimile data received from the facsimile having the sender number 051-356-7890 to sender addresses g@h.i and h@i.j by email.

Descriptions of the second workform 43 are the same as the descriptions of the first workform 42, and thus will not be repeated.

Accordingly, since a workform which is redefined corresponding to identification information of a user is used, unnecessary workforms may be prevented from being repeatedly created. Also, since a workform which is redefined corresponding to identification information of a user is used by only an authenticated user, a security function of the image forming apparatus 100 may be improved.

Figure 5:
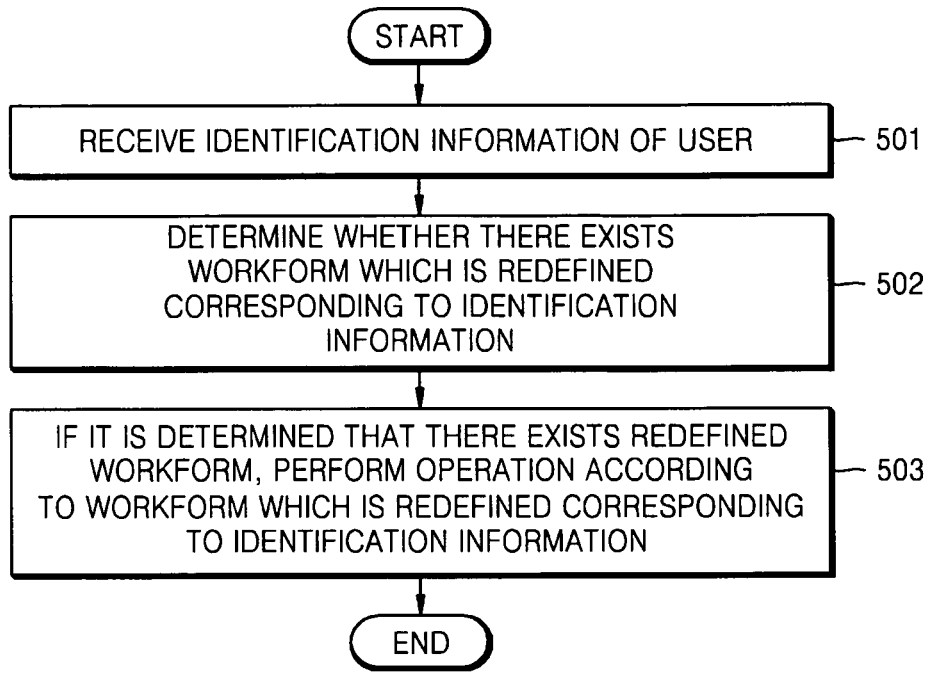
FIG. 5 is a flowchart illustrating a method of performing an operation in the image forming apparatus of FIG. 1, according to an embodiment of the present general inventive concept.
Figure 6:
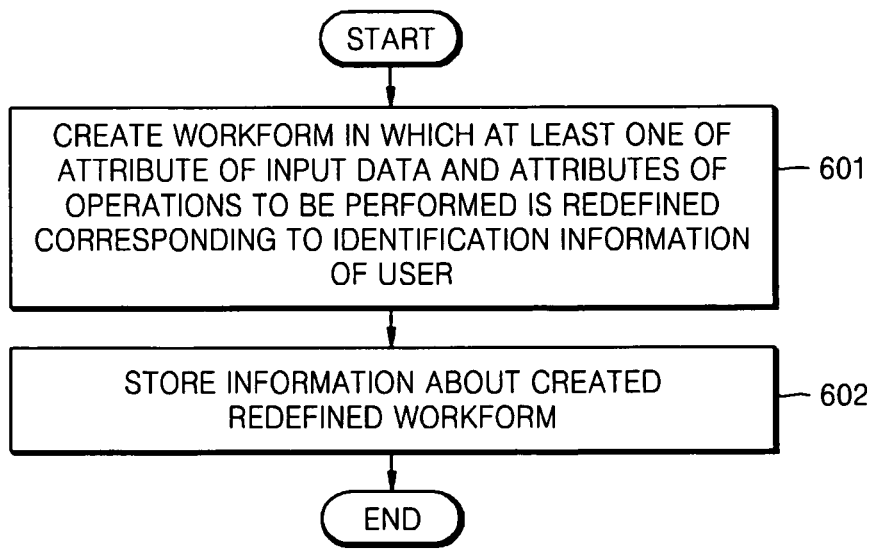
FIG. 6 is a flowchart illustrating a method of creating a workform in the image forming apparatus of FIG. 1, according to an embodiment of the present general inventive concept.

FIGS. 5 and 6 are flowcharts illustrating a method of performing an operation in the image forming apparatus 100 of FIG. 1 and a method of creating a workform according to embodiments of the present general inventive concept. Referring to FIGS. 5 and 6, the methods of FIGS. 5 and 6 include steps sequentially performed in the image forming apparatus in FIGS. 1 through 3. Accordingly, although not described, the descriptions already made in relation to the image forming apparatus 100 illustrated in FIGS. 1 through 3 may apply to the methods of FIGS. 5 and 6.

FIG. 5 is a flowchart illustrating a method of performing an operation in the image forming apparatus 100 of FIG. 1, according to an embodiment of the present general inventive concept.

In operation 501, the interface unit 110 receives identification information of a user of the image forming apparatus 100. The interface unit 110 may directly receive identification information of a user, or receive identification information from the host device 200 connected to the image forming apparatus 100.

In operation 502, the determination unit 140 determines whether there exists a workform which is redefined corresponding to the identification information received in operation 501 with respect to a workform selected by the user from among one or more workforms pre-existing in the image forming apparatus 100.

If it is determined in operation 502 that there exists a workform which is redefined corresponding to the identification information, the method proceeds to operation 503. In operation 503, the operation performing unit 150 performs an operation corresponding to the workform which is redefined corresponding to the identification information.

FIG. 6 is a flowchart illustrating a method of creating a workform in the image forming apparatus 100 of FIG. 1, according to an embodiment of the present general inventive concept.

In operation 601, the workform creation unit 117 creates a workform corresponding to identification information of a user in which at least one of an attribute of input data and attributes of operations to be performed is redefined with respect to a workform selected by the user from among one or more workforms pre-existing in the image forming apparatus 100.

In operation 602, the storage unit 120 stores information about the redefined workform created in operation 602. The information about the redefined workform may be stored in the workform information database 124 of the storage unit 120.

Accordingly, a user may create and store a workform which is redefined corresponding to identification information of the user. Accordingly, since a plurality of workforms in which an attribute of input data and attributes of operations to be performed are modified are prevented from being repeatedly created, an extravagant use of resources may be prevented.

Also, since a workform which is redefined corresponding to identification information of a user may be used by only the user corresponding to the identification information, a security function of the image forming apparatus 100 may be improved. Furthermore, the user may conveniently perform a plurality of repeatedly operations by using a workform function.

As described above, the user may create and store a workform which is redefined corresponding to identification information of the user in an image forming apparatus. Accordingly, since a plurality of workforms in which an attribute of input data and attributes of operations to be performed are modified may be prevented from being repeatedly created, an extravagant use of resources may be prevented.

Meanwhile, the above embodiments of the present general inventive concept may be embodied as a computer program. The computer program may be stored in a computer-readable recording medium, and executed using a general digital computer. Data used in the aforesaid method may be recorded on a computer-readable recording medium by using various means. Examples of the computer-readable medium include a magnetic recording medium (a ROM, a floppy disk, a hard disk, etc.), and an optical recording medium (a CD-ROM, a DVD, etc.).

While the present general inventive concept has been particularly shown and described with reference to exemplary embodiments thereof using specific terms, the embodiments and terms have been used to explain the present general inventive concept and should not be construed as limiting the scope of the present general inventive concept defined by the claims. The preferred embodiments should be considered in a descriptive sense only and not for purposes of limitation. Therefore, the scope of the general inventive concept is defined not by the detailed description of the general inventive concept but by the appended claims, and all differences within the scope will be construed as being included in the present general inventive concept.

What is claimed is:

1. A method of performing an operation in an image forming apparatus by using a workform which defines one or more workflows indicating one or more operations to be performed with respect to input data, the method comprising:
    receiving identification information of a user of the image forming apparatus;
    with respect to a selected workform selected by the user from among one or more workforms stored in the image forming apparatus, determining whether the image forming apparatus stores a redefined workform which is redefined corresponding to the received identification information, wherein the redefined workform includes a plurality of same operations with the selected workform, and at least one of an attribute of the input data of a plurality of same operations of a plurality of workflows defined in the redefined workform and attributes of the plurality of the same operations of the plurality of workflows defined in the redefined workform is redefined with respect to the selected workform;

if it is determined that the image forming apparatus stores the redefined workform, performing an operation according to the workform which is redefined corresponding to the identification information;

with respect to the selected workform, creating a workform which is redefined corresponding to the received identification information; and storing information about the created redefined workform, wherein operations include a printing operation, an operation of sending an email message, a fax operation, and a storing operation, wherein the attribute of the input data which is redefined with respect to the selected workform includes at least one of a name of a document stored in the image forming apparatus, a location of the document stored in the image forming apparatus, a name of a host device from which print data is transmitted to the image forming apparatus, and a sender number from which facsimile data is transmitted to the image forming apparatus.

2. The method of claim 1, wherein, in the redefined workform, at least one of the attribute of the input data and attributes of the plurality of operations to be performed of the workflow defined in the workform is redefined for each of a plurality of users.

3. The method of claim 2, wherein the attributes of the operations to be performed comprise at least one of a storage location corresponding to a stored operation performed in the image forming apparatus, the sender number corresponding to an operation of transmitting the facsimile data performed in the image forming apparatus, a sender address corresponding to the operation of sending the email message performed in the image forming apparatus, an attribute of an external device corresponding to an operation of transmitting data to an external device performed in the image forming apparatus, and a print attribute corresponding to the printing operation performed in the image forming apparatus.

4. The method of claim 1, further comprising creating a common workform for users of the image forming apparatus,
wherein the creating of the workform which is redefined corresponding to the received identification information comprises creating the workform which is redefined corresponding to the received identification information with respect to the created common workform.

5. The method of claim 1, wherein the storing comprises storing information about the workform which is redefined corresponding to each of a plurality of users with respect to the selected workform.

6. The method of claim 1, wherein the performing of the operation comprises:
if it is determined the image forming apparatus stores the redefined workform, extracting information about the workform which is redefined corresponding to the identification information; and
performing at least one of the storing operation, the fax operation, the operation of sending the email message, an operation of transmitting data to an external device, and the printing operation according to the extracted workform.

7. A non-transitory computer-readable recording medium having embodied thereon one or more programs for executing the method of claim 1.

8. A method of creating a workform which defines one or more workflows indicating one or more operations to be performed in an image forming apparatus with respect to input data, the method comprising:
with respect to a selected workform selected by a user from among one or more workforms stored in the image forming apparatus, creating a redefined workform, using at least one processor, which corresponds to identification information of the user in which at least one of an attribute of the input data and attributes of operations to be performed is redefined, wherein the redefined workform includes a plurality of the same operations with the selected workform, and at least one of the attribute of the input data of a plurality of the same operations of a plurality of workflows defined in the redefined workform and attributes of the plurality of the same operations of the plurality of workflows defined in the redefined workform is redefined with respect to the selected workform;
storing information about the created redefined workform; and
creating a common workform for users of the image forming apparatus,
wherein the creating of the redefined workform comprises creating the workform corresponding to the received identification information of the user in which at least one of the attribute of the input data and the attributes of the plurality of operations to be performed is redefined with respect to the created common workform, and
wherein the one or more operations include a printing operation, an operation of sending an email message, a fax operation, and a storing operation, wherein the attribute of the input data which is redefined with respect to the selected workform includes at least one of a name of a document stored in the image forming apparatus, a location of the document stored in the image forming apparatus, a name of a host device from which print data is transmitted to the image forming apparatus, and a sender number from which facsimile data is transmitted to the image forming apparatus.

9. An image forming apparatus for performing an operation by using a workform which defines a plurality of workflows indicating a plurality of operations to be performed with respect to input data, the image forming apparatus comprising:
an interface unit to receive identification information of a user of the image forming apparatus;
a storage unit to store information about one or more workforms and identification information of users of the image forming apparatus;
a selection unit to select any one workform from among the stored workforms according to selection information input by the user;
a determination unit to determine whether the image forming apparatus stores a workform which is redefined corresponding to the received identification information with respect to the selected workform, wherein the redefined workform includes a plurality of same operations with the selected workform, and at least one of an attribute of the input data of the plurality of the same operations of the plurality of workflows defined in the redefined workform and attributes of a plurality of the same operations of a plurality of workflows defined in the redefined workform is redefined with respect to the selected workform;
an operation performing unit for performing an operation according to the workform which is redefined corresponding to the identification information, if it is determined that the image forming apparatus stores the redefined workform; and a workform creation unit to create the workform which is redefined corresponding to the received identification information with respect to the selected workform, wherein the plurality of operations include at least two operations selected from a printing operation, an operation of sending an email message, a fax operation, and a storing operation, wherein the attribute of the input data which is redefined with respect to the selected workform includes at least one of a name of a document stored in the image forming apparatus, a location of the document stored in the image forming apparatus, a name of a host device from which print data is transmitted to the image forming apparatus, and a sender number from which facsimile data is transmitted to the image forming apparatus.

10. The image forming apparatus claim 9, wherein, in the redefined workform, at least one of the attribute of input data and the attribute of the plurality of operations to be performed of workflows defined in the workform is redefined for each of a plurality of users.

11. The image forming apparatus of claim 10, wherein the attributes of the operations to be performed comprise at least one of a storage location corresponding to a storage operation performed in the image forming apparatus, the sender number corresponding to an operation of transmitting the facsimile data performed in the image forming apparatus, a sender address corresponding to the operation of sending the email message performed in the image forming apparatus, an attribute of an external device corresponding to an operation of transmitting data to an external device performed in the image forming apparatus, and a print attribute corresponding to the printing operation performed in the image forming apparatus.

12. The image forming apparatus of claim 9, wherein the workform creation unit creates a common workform for users of the image forming apparatus, and creates the workform which is redefined corresponding to the received identification information with respect to the created common workform.

13. The image forming apparatus of claim 9, wherein the operation performing unit comprises:
   an extraction unit to extract, if it is determined that the image forming apparatus stores the redefined workform, from the storage unit information about the workform which is redefined corresponding to the identification information; and
   a performing unit to perform at least one of the storing operation, the fax operation, the operation of sending the email message, an operation of transmitting data to an external device, and the printing operation according to the extracted workform.

14. The image forming apparatus of claim 9, further comprising an authentication unit to authenticate the identification information received via the interface unit by referring to the identification information stored in the storage unit, wherein the determination unit determines whether the image forming apparatus stores the workform which is redefined corresponding to the authenticated identification information.

15. The image forming apparatus of claim 9, further comprising a database management unit to manage the storage unit to match the workform which is redefined corresponding to the identification information to the identification information and to store the redefined workform in the storage unit.

* * * * *

UNITED STATES PATENT AND TRADEMARK OFFICE
CERTIFICATE OF CORRECTION

PATENT NO. : 9,215,348 B2
APPLICATION NO. : 13/137473
DATED : December 15, 2015
INVENTOR(S) : So-yeon Kwon et al.

Page 1 of 1

It is certified that error appears in the above-identified patent and that said Letters Patent is hereby corrected as shown below:

In the Claims

Claim 1, Column 17, Line 15:
Delete "wherein" and insert -- wherein the one or more --, therefor.

Claim 8, Column 18, Line 14:
Delete "of the" and insert -- of --, therefor.

Claim 10, Column 19, Line 20:
Delete "apparatus claim" and insert -- apparatus of claim --, therefor.

Signed and Sealed this
Ninth Day of August, 2016

Michelle K. Lee
*Director of the United States Patent and Trademark Office*